July 1, 1969     A. S. FENSTER     3,452,766
INDICATOR POST VALVE WITH FAIL-SAFE FEATURE
Filed April 9, 1964     Sheet 1 of 3
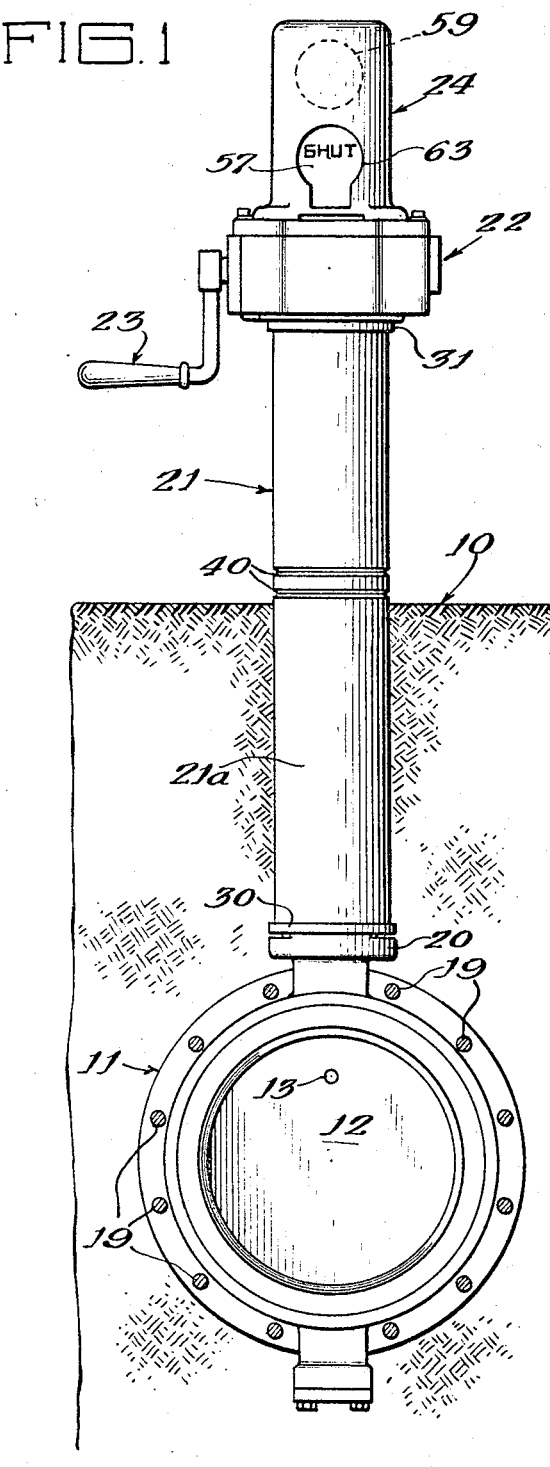
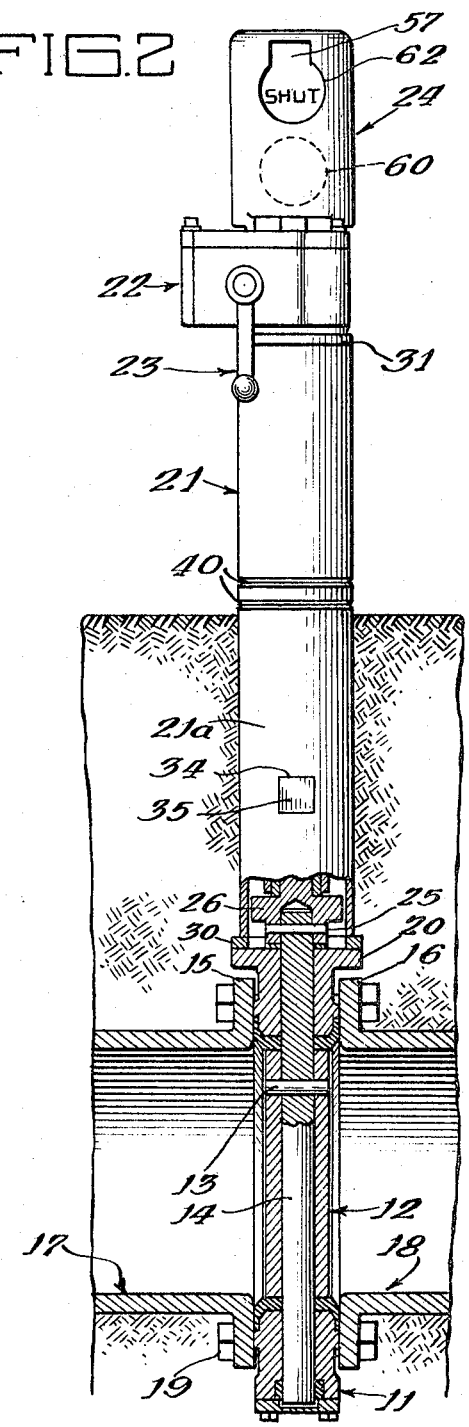
Inventor:
Abraham S. Fenster
By: Hofgren, Wegner, Allen,
Stellman & McCord
Attorneys

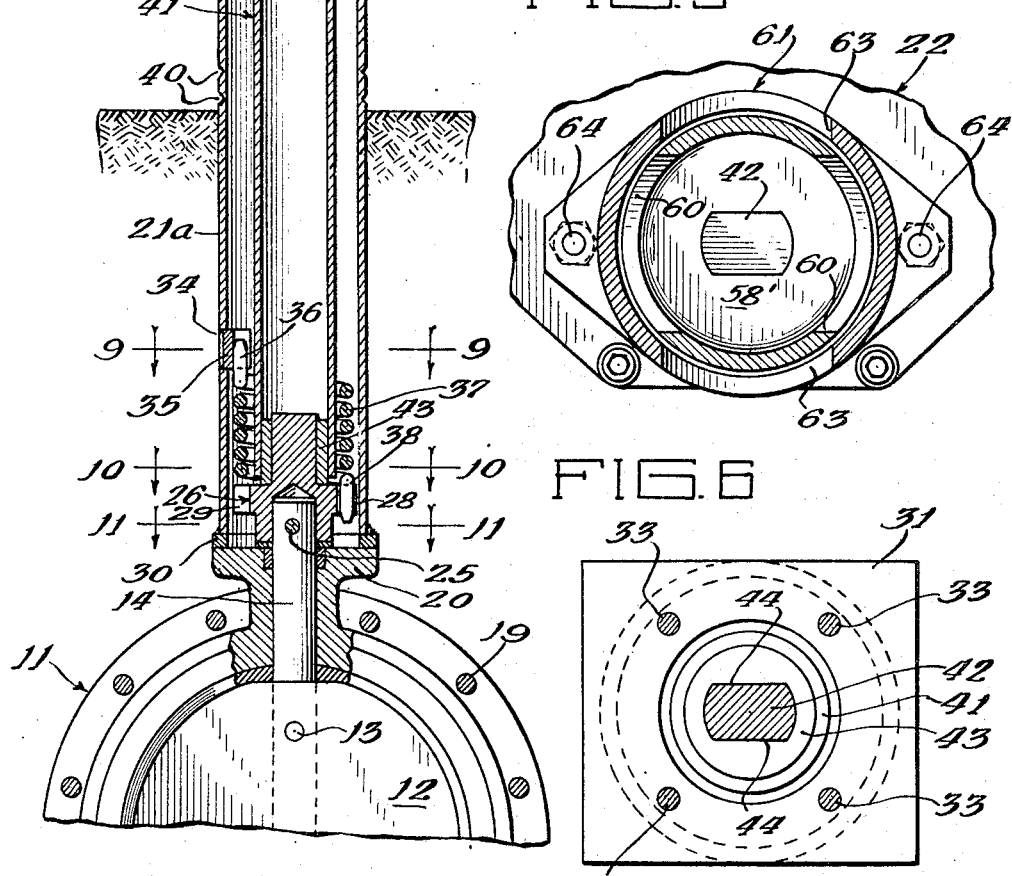

July 1, 1969     A. S. FENSTER     3,452,766
INDICATOR POST VALVE WITH FAIL-SAFE FEATURE
Filed April 9, 1964
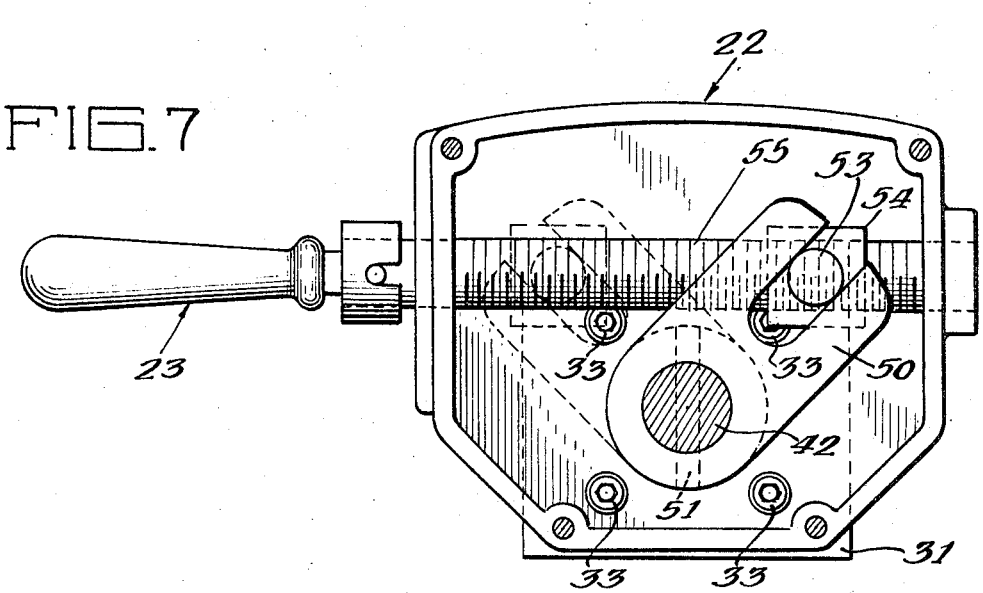
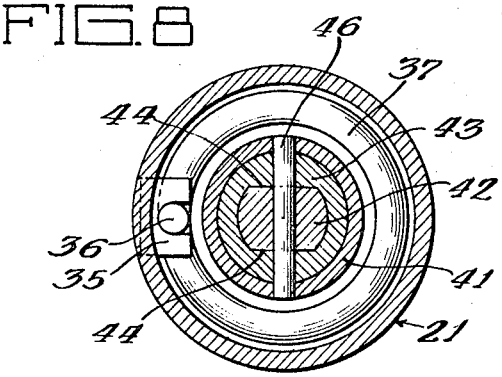
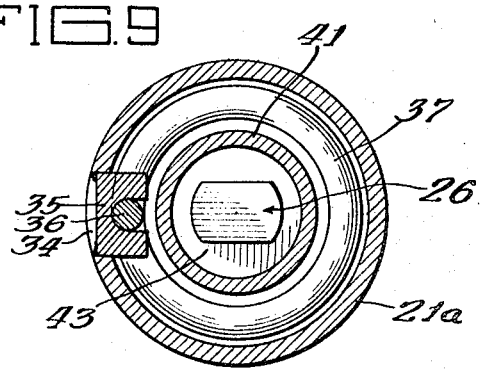
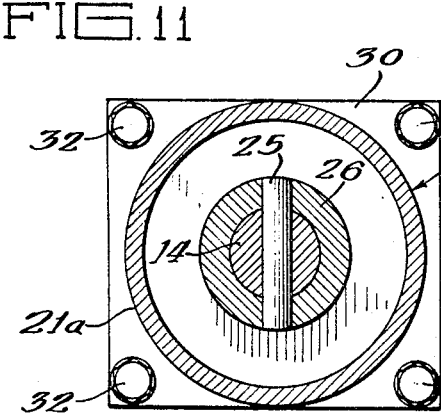
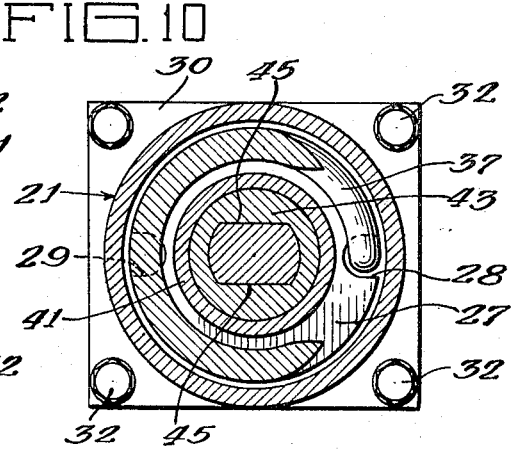

United States Patent Office 3,452,766
Patented July 1, 1969

3,452,766
INDICATOR POST VALVE WITH FAIL-SAFE FEATURE
Abraham S. Fenster, Chicago, Ill., assignor to Henry Pratt Company, a corporation of Illinois
Filed Apr. 9, 1964, Ser. No. 358,524
Int. Cl. F16k *13/04, 17/14, 17/40*
U.S. Cl. 137—68                                    14 Claims

ABSTRACT OF THE DISCLOSURE

This invention is directed, in brief, to the provision of a valve assembly having a member which is associated with the valve operating shaft and the valve housing, the member being responsive to turning of the valve shaft as the valve is moved from a first position to create a condition in the member which exerts forces on the shaft tending to return the shaft to the first position. System friction in the valve operator normally overcomes the force exerted on the member, this force being activated when an exposed part of the assembly is damaged in such a fashion as to operatively disconnect the valve operator from the remainder of the valve structure.

---

This invention relates to a fail-safe valve with positive position indication and more particularly to a butterfly type valve having an indicator post with means for obtaining positive visual indication of valve position without error and with automatic means for moving the valve to a desired position in the event that exposed parts of the valve are accidentally damaged.

The present valve is particularly intended for use in the control of water lines to the sprinkler systems incorporated in many types of buildings. The conditions of the use of the valve most often require that it be placed outside, but relatively close to the building and control the supply of water to one or more loops of lines within the buildings supplied with a number of sprinkler heads. The insurance companies desire that the valves controlling such sprinkler systems be inspected frequently and in this respect, desire positive indication of the valve position from a distance in order to reduce the cost of making the inspection. In the past many valve position indicators were subject to human error during manufacture which could result in the indication being exactly opposite to the valve position.

The placement of the valves outside a building has often put the valves in alleyways, somewhat exposed to vehicular traffic or construction work on adjacent property, subjecting the valves to accidental damage. The valves controlling sprinkler systems should always be open even in the event of accident so that water is available to put out a fire.

The primary object of this invention is to provide a new and improved fail-safe valve assembly with positive valve position indication.

Another object of the invention is to provide a valve assembly which results in an absolute relationship between valve position and valve position indicator brought about by the mere fact of assembling the parts comprising the valve and its indicator.

Another object is to provide a valve structure which will automatically open and retain the valve open should accident and damage occur to exposed parts of the valve assembly.

A further object is to provide a valve assembly which permits certain flexibility in the positioning of an operator relative to a valve, but which cannot be assembled in a fashion or manner except to give a positive position indication for the valve.

Other objects, features and advantages of the present invention will be apparent from the following description of a preferred embodiment illustrated in the accompanying drawings, in which:

FIGURE 1 is an elevational view of a valve assembly including the invention shown in position in a pipeline underground, the pipeline being broken away for clarity of illustration;

FIGURE 2 is a view similar to FIGURE 1 at 90° thereto and taken from the left-hand side of FIGURE 1;

FIGURE 3 is a sectional view partially broken away and partially in elevation of the structure shown in FIGURE 1;

FIGURE 4 is a horizontal sectional view through the upper part of the indicator taken along line 4—4 in FIGURE 3;

FIGURE 5 is a view similar to FIGURE 4 taken along line 5—5 in FIGURE 3;

FIGURE 6 is a horizontal sectional view taken at the top of the supporting column for the valve operator along line 6—6 in FIGURE 3;

FIGURE 7 is a sectional view through the top of the valve operator showing the operator as if its cover were removed and taken along line 7—7 in FIGURE 3;

FIGURE 8 is a horizontal sectional view showing a driving connection between the operator shaft and the drive member taken along line 8—8 in FIGURE 3;

FIGURE 9 is a sectional view through the support column showing the connection of the fail-safe spring to the column taken at line 9—9 in FIGURE 3;

FIGURE 10 is a horizontal sectional view showing the connection of the spring to the valve shaft taken along line 10—10 in FIGURE 3; and FIGURE 11 is a horizontal sectional view through the supporting column valve shaft and drive collar taken along line 11—11 in FIGURE 3.

FIGURES 1 and 2 illustrate a buried valve below grade level 10, the valve having a housing or body 11 within which a closure member or disc 12 is secured as by a pin 13 to a valve shaft 14 journalled in appropriate bearings in the valve housing. The particular type of butterfly valve illustrated is one wherein the body is of the wafer type mounted between opposite flanges 15 and 16 of adjacent pipelines 17 and 18, respectively, the mounting being accomplished by a plurality of bolts 19 joining the flanges and pulling them against the body of the valve. In the control of water pipelines to sprinkler systems the pipeline may be at various depths below grade, usually no less than two and one-half feet and being as much as ten feet below ground level.

The housing for the valve is provided with a platform 20 through which the valve shaft extends and which provides a mounting base for an upstanding hollow support column 21. A valve operator 22 provided with a crank 23 fits upon and is supported by the column and internally of the column is provide with a driving connection to the valve shaft. A valve position indicator 24 is mounted upon the upper end of the operator for the purpose of giving visual indication for the position of the buried valve.

From the sectional view of FIGURE 3 and the drawings following FIGURE 3, the structure for achieving the objects and advantages of the present invention may be understood.

In the manufacture of the butterfly valve, the shaft 14 is provided with a positive orientation with the closure disc 12 and an opening is provided for the pin 25 in the upper end of the shaft upon which a drive collar 26 is to be mounted. The collar as shown in FIGURES 3 and 10 has an outwardly extending flange 27 with a pair of diametrically opposite notches 28 and 29 so that the notches will occupy the same position relative to the shaft 14 in either of two positions 180° apart in which the drive collar may be assembled to the valve shaft 14. The sameness of the position of the drive collar to the shaft is important in receiving the fail-safe spring to control the position of the valve in case of accident.

The supporting column 21 for the operator is manufactured with a plate 30 at its lower end to be attached to the platform 20 of the valve housing and a plate 31 at its upper end for reception of the valve operator. The lower plate 30 is provided with four bolt openings in its corners to receive bolts 32 arranged in a rectangular pattern. In FIGURE 11 the centers of the bolts on the left-hand side of the plate are closer together than the bolts across the top or bottom of the plate as shown in the drawing. The arrangement of the bolts 32 permits the supporting column 21 to be assembled to the valve in either of two positions 180° apart, that is, the column rotated about the axis of the valve shaft into either of two positions 180° apart.

The column upper plate 31 shown in FIGURES 3, 6 and 7 is also provided with bolt openings to receive bolts 33 also in a rectangular pattern, so that the operator may be attached to the upper end of the column in either of two positions 180° apart. In the manufacturing of the column 21 an opening 34 in the side wall of the column and each of the plates 30 and 31 are aligned in a fixture in which the parts are welded together. The opening 34 in the side of the column receives a spring retainer block 35 into which one end 36 of a coil spring 37 is received, the other end 38 of the spring being received in one or the other of the notches in the drive collar 26 pinned to the valve shaft.

The supporting column is intended to maintain the valve operator in a positive drive relationship with the valve, but in case of accident, a portion of the column is to remain with the valve in a position to allow the coil spring 37 to open the valve in the event that it was closed at the time of the accident. To effect a separation of the column substantially at grade, the column is provided with a pair of grooves or notches 40 extending circumferentially around the column providing the column with a weakened section. Should a truck hit the exposed parts of the indicator post, the column is intended to break at the weakened section, thus leaving a lower section 21a of the column attached to the valve housing buried in the ground.

The operation of the spring to maintain the valve open is brought about by a stressing of the spring should the valve be closed. A drive tube 41 connects a stub shaft 42 of the operator to the drive collar 26. The drive tube has a hollow cylindrical part with a drive bushing 43 in either end. From the sections of FIGURES 8 and 10, it may be noted that the lower end of the stub shaft in the operator is provided with two opposite flats 44 and that the upstanding part of the drive collar is similarly provided with flats 45 so that a certain alignment must be in existence before the drive tube will engage between the stub shaft and the valve shaft. In addition, the stub shaft of the operator is pinned as by a pin 46 to the drive column, thus insuring that should the valve operator be brushed aside accidentally, the drive column will be carried with it and thus pull off of the drive collar 26. In manufacturing a drive tube a fixture is utilized to insure that the drive bushings are properly oriented within the hollow tube.

In making the connections of the supporting column to the valve and the drive tube to the operator, it may be noted that the parts may be oriented in either of two positions 180° apart. Assembly can be effected in either of the two positions.

The operator 22 has a scotch-yoke type of operation with a crank 50 secured to the stub shaft 42 by a pin 51 placed slightly off center so that the assembly of the crank to the shaft can be effected in only one way. The crank arm 50 is bifurcated so as to engage a round part 53 upon a traveling nut 54 rotatably received upon a shaft 55 connected with the operating handle 23. Cranking of the shaft 55 may cause about 90° movement of the crank as illustrated between the full and dotted lines in FIGURE 7, thus opening and closing the butterfly type valve.

The indicator 24 is disclosed in greater detail in the pending application of Smith and Woolley, Ser. No. 345,038, filed Feb. 14, 1964, now Patent No. 3,238,915 and assigned to the assignee of this invention. The indicator operates upon the principle that the valve is open when one can see through aligned openings in the indicator and closed when such line of vision through the indicator is blocked. In this respect the inner member 57 is mounted upon the stub shaft so as to turn with it, there being opposite flats 58 on the portion of the shaft 42 extending into the base 58' of the inner member of the indicator. It is thus possible that the inner member may be placed upon the shaft of the operator in either of two positions 180° apart. The inner member has opposite aligned openings 59 at its upper level and openings 60 90° therefrom in its lower portion. The indicator also utilizes an outer cover 61 having upper openings 62 opposite each other and lower openings 63 90° from the upper openings. The arrangement is such that the inner member may turn within the outer housing to align or block the openings, thus permitting an inspector to either see through the operator or not to determine whether the valve is open or closed. As shown in FIGURES 4 and 5, the outer housing is secured on top of the operator by a pair of bolts 64, permitting the housing to be installed in either of two 180° opposite positions.

When the assembly of valve, post, operator and indicator is made, the parts may be put together in either of several positions so that the operator handle 23 may be in a convenient location. Each of the connections, however, may be made only 180° opposite to a selected position so that no matter how the parts are assembled, the mere fact of assembly insures that the indicator gives a visual indication of the true position of the valve closure within the valve housing. Normally, the valve is left open. However, after a fire, it is desired to be able to shut off the sprinklers and for this reason an operator such as described is desirable. When the operator closes the valve, the coil spring is charged or stressed so that it has a tendency to urge the valve closure back to an open position. The friction in the screw shaft 55 and scotch-yoke of the operator is sufficient to overcome the force exerted by the coil spring and thus the valve will remain in whatever position it has been placed by means of the operator. Should the post be broken or the drive shaft or coupling parts between the operator and valve break for any reason, the spring will then automatically open the valve insuring that the sprinkler system controlled by the valve is operative.

The foregoing detailed description has been given for clearness of understanding only and no unnecessary limitations should be understood therefrom as some modifications will be obvious to those skilled in the art.

I claim:
1. A fail-safe valve assembly, comprising:
   a valve housing having a closure on a shaft and an operator disengageably connected with said shaft for holding the valve closure in closed, open and selected positions between closed and open, said housing being adapted for assembly in a fluid line wherein fluid flow may be controlled by said closure,
   means connecting the valve housing and operator, said means being subject to accidental breakage,
   a weakened portion in said connecting means intermediate the valve operator and valve housing,
   a portion of said connecting means being secured to the valve housing to remain with the housing in event of such breakage,
   and auxiliary valve closure moving means including a member operatively associated with the valve shaft and the operator, and secured to said connecting means portion, said member responsive to movement of said valve shaft and operator from a first valve closure position to be placed in a stressed condition wherein said member exerts force on said valve shaft tending to return the same to said first position, system friction of said operator preventing such return movement, said closure moving means thereby being responsive to operable separation of the connecting means and operator to return the valve shaft and closure to said first position.

2. A fail-safe valve assembly intended to open in event of damage to a portion of the valve, comprising:
  a valve housing intended for use below grade and having a butterfly type closure on a shaft, said housing constructed and arranged for installation in a fluid line wherein fluid flow may be regulated by said closure,
  an operator intended for placement above grade and disengageably connected to the valve shaft for opening and closing movement of the valve closure,
  means mounting the operator on the valve housing,
  a weakened portion in said operator mounting means intermediate the valve housing and operator for breaking the mounting at such portion in the event the operator mounting is struck with a damaging force, leaving some of the mounting means attached to the valve housing, and
  force applying means including a member operably connected between the valve shaft and a portion of the mounting means connected to the valve housing to open the valve closure upon removal of the operator, said member being responsive to movement of the valve shaft from a first position to be distorted thereby and exert force on said shaft tending to return the shaft to said first position, said operator capable of overcoming said force applied by said member when the valve and operator are operatively associated.

3. A fail-safe valve assembly, comprising:
  a valve housing having a closure on a shaft, said housing having means for assembling the same in a fluid line wherein fluid flow may be controlled by said closure,
  an operator for holding the valve closure in open, closed and positions intermediate open and closed positions and having a disengageable connection with said shaft,
  connecting means extending between the valve housing and operator subject to breakage accidentally,
  means for concentrating such breakage intermediate the valve housing and operator leaving a portion of such connecting means attached to the valve housing in event of such breakage,
  and spring means secured between the valve shaft and said portion of the connecting means, said spring being distortable responsive to movement of said shaft from a first valve position whereby said spring exerts stress on said shaft tending to return said shaft to said first position, to automatically move the valve closure to desired position in event of removal of the operator.

4. A valve assembly as specified in claim 3 in which the connecting means comprises a hollow member supporting the operator upon the valve housing, said means for concentrating such breakage being a weakened section in said hollow member intermediate its ends to leave a portion secured to the valve housing upon accidental breakage of the operator away from operative relation to the valve housing.

5. A valve assembly as specified in claim 4 wherein the operator has a shaft and means connected to the valve shaft for effecting opening and closing movements of the valve closure, said connected means having means for readily disconnecting upon movement of the operator away from the valve housing as upon breakage of said hollow member.

6. A fail-safe-open valve having means urging the valve to desired open position, comprising:
  a valve housing having a butterfly type valve closure mounted on a shaft for about 90° of rotary movement of the closure between open and closed positions, said housing having means for installing the housing in a fluid line wherein the closure may control the flow of fluid therethrough,
  an operator connected to the valve shaft for holding the valve closure in desired selected positions between fully open and fully closed,
  connecting means securing the operator to the valve housing,
  a coil spring between the valve shaft and connecting means for receiving and retaining a valve opening force upon closing movement of the valve closure by means of said operator,
  means restraining release of said opening force while said connecting means remain in tact between said valve housing and operator,
  and means for releasing said opening force upon disconnection of the connecting means.

7. An indicator post valve with means providing correct indication of valve position by assembly, comprising:
  a valve housing with a butterfly type valve closure on a shaft, said housing constructed and arranged for assembly in a fluid line for controlling the flow of fluid therethrough,
  an operator support member connected to the valve housing and an operator housing connected to the support, the connections each being 180° reversible only, a valve operator mounted in the operator housing,
  a drive member between the operator and valve shaft having means to connect with both only when the operator is in one of either 180° reversible positions on the support member,
  a valve position indicator secured to the operator and movable therewith and a housing for the indicator secured thereover and to the operator housing, each of said connections of said indicator to the operator and said indicator housing to the operator housing being capable of assembly in only two positions 180° apart 180° reversible only so that the indicator may be exposed to view in proper position to positively indicate valve closure position,
  assembly of said valve housing, operator and indicator bringing the indicator into positive alignment with the valve closure for correct indication of valve position.

8. An indicator post valve assembly with means providing correct indication of valve position by assembly, comprising:
  a butterfly valve with a valve housing and a closure movable through about 90° between fully open and fully closed positions, said valve constructed and arranged for assembly in a fluid line for control of fluid flow therethrough,
  a support for a valve operator mounted on the valve housing,
  an operator mounted on the support and having a driving connection with the valve closure, an operator housing mounted on the support,
  an indicator mounted on the valve operator for movement therewith and having a portion for alignment with the valve closure to indicate valve position visually,
  and each mounting and connection having means only fitting together in assembly upon positioning of the respective mounted and connected parts in only two relative positions 180° apart whereby assembly of the parts insures proper visual indication of the valve position.

9. A valve as specified in claim 8 wherein the support for the valve operator is an elongated hollow post with a mounting plate at each end, such mounting plates each having bolt openings to mate with the valve housing and operator housing only in either of two positions 180° apart.

10. A valve as specified in claim 8 wherein the driving connection between the operator and valve closure includes a drive tube within the operator support, said drive tube having a drive bushing in each end with a shaft-receiving asymmetrical opening therein to receive an operator shaft and valve closure shaft coaxial with the drive tube and only when oriented in either of two positions 180° apart.

11. An indicator post valve assembly of parts with means providing correct indication of valve position by assembly, comprising:
- a valve housing with a butterfly type closure on a shaft, said housing being adapted for assembly in a fluid line to control the flow of fluid therethrough,
- a post secured to the housing coaxial with the shaft,
- an operator housing mounted on the post remote from the valve and having a stub shaft coaxial with the valve shaft, means providing a disengageable driving connection between the valve and stub shafts.
- a valve position indicator connected to the stub shaft and having a cover connected over the indicator and to the operator housing, together providing the same visual indication in only two positions 180° apart,
- each of said connections respectively having asymmetrical means requiring positioning of the respective parts of the assembly in one of two positions 180° apart about said coaxial shafts whereby assembly of said parts insures alignment of the indicator with the valve closure properly to indicate valve position.

12. A fail-safe-open butterfly valve assembly, comprising:
- a valve housing having a closure secured to a shaft, said housing being adapted for assembly in a fluid line to control the flow of fluid therethrough,
- a hollow operator support column secured to the valve housing and extending away from the housing generally about the valve shaft,
- an operator housing mounted on the support column and having on operator shaft coaxial with the valve shaft,
- a drive member connecting the operator shaft and valve shaft with means readily disconnecting said shafts upon relative movement of the valve housing and operator housing apart from operative assembly,
- a coil spring inside the support column having one end secured to the column and the other end engaging the valve shaft, said spring being at rest when the valve is open and being stressed by turning the valve shaft toward closed position so that the spring urges the valve closure toward open position,
- said operator through said drive member having means to prevent said spring from opening said valve while the operator and valve are in operative assembly,
- and a weakened section in said support column outwardly from the valve housing beyond said spring to break the column at such weakened section in event of accident removing the operator from operative assembly with the valve and leaving said spring secured to a remaining section of such column to open the valve.

13. An indicator post butterfly valve assembly having means providing correct indication of valve position by assembly of its parts, comprising:
- a butterfly valve housing having a closure on a valve shaft, said housing being adapted for assembly in a fluid line for control of fluid flow through the line by the closure,
- a hollow operator support column mounted on the valve housing about the valve shaft with means for securing the column to the housing in either of two positions 180° apart about the shaft axis,
- a valve operator housing mounted on the column remote from the valve with means for securing the operator housing to the column in only two positions 180° apart, a valve operator mounted in the valve housing,
- a drive member engageable with the valve shaft and operator only when the column is connected to the valve housing and the operator to the column in said positions,
- and a valve position indicator operably associated with the operator for movement responsive to operator movement to visually indicate the operator position, said connections between said column and the operator and valve housing respectively insuring that indicator indication of operator position is identical to valve position.

14. A valve assembly as specified in claim 13 wherein a coil spring is secured at one end within the column adjacent the valve housing and at the other end is in engagement with the valve shaft in either of said two positions of the column to open the valve in event of accidental removal of the operator.

References Cited

UNITED STATES PATENTS

| | | | |
|---|---|---|---|
| 684,191 | 10/1901 | Chatham | 137—553 X |
| 1,329,099 | 1/1920 | Spencer | 137—463 |
| 1,794,581 | 3/1931 | Burdick | 251—313 X |
| 2,980,125 | 4/1961 | Grant et al. | 137—68 |
| 3,250,291 | 5/1966 | Roy | 251—306 X |

WILLIAM F. O'DEA, *Primary Examiner.*

RICHARD GERARD, *Assistant Examiner.*

U.S. Cl. X.R.

137—315, 556; 251—229, 308